(12) United States Patent
Zenou

(10) Patent No.: US 6,991,159 B2
(45) Date of Patent: Jan. 31, 2006

(54) POINT OF SALE TERMINAL INCLUDING A SOCKET FOR RECEIVING A MOBILE DEVICE

(75) Inventor: Shlomo M. Zenou, Great Neck, NY (US)

(73) Assignee: Lipman Electronic Engineering Ltd., Rosh Haayin (IL)

(*) Notice: Subject to any disclaimer, the term of this patent is extended or adjusted under 35 U.S.C. 154(b) by 32 days.

(21) Appl. No.: 10/670,576

(22) Filed: Sep. 25, 2003

(65) Prior Publication Data

US 2004/0060982 A1   Apr. 1, 2004

Related U.S. Application Data

(60) Provisional application No. 60/418,340, filed on Oct. 16, 2002, provisional application No. 60/414,409, filed on Sep. 30, 2002.

(51) Int. Cl.
*G06K 15/00* (2006.01)

(52) U.S. Cl. .......................................... 235/383; 705/17
(58) Field of Classification Search ................. 235/383, 235/462.45, 462.46, 462.13, 472.02, 472.03; 705/16, 17, 39, 18, 41, 65, 66; 713/200
See application file for complete search history.

(56) References Cited

U.S. PATENT DOCUMENTS

| | | | | |
|---|---|---|---|---|
| 4,454,414 A | * | 6/1984 | Benton ......................... | 705/41 |
| 5,110,226 A | | 5/1992 | Sherman et al. .............. | 400/88 |
| 5,336,870 A | * | 8/1994 | Hughes et al. ............... | 235/379 |
| 5,347,115 A | | 9/1994 | Sherman et al. ............ | 235/472 |
| 5,486,062 A | | 1/1996 | Tsuramaru .................. | 400/618 |
| 5,489,773 A | | 2/1996 | Kumar ....................... | 235/462 |
| 5,535,407 A | | 7/1996 | Yanagawa et al. | |
| 5,640,002 A | | 6/1997 | Ruppert et al. ............. | 235/472 |
| 5,878,211 A | * | 3/1999 | Delagrange et al. ........ | 713/200 |
| 5,900,870 A | | 5/1999 | Malone et al. .............. | 345/333 |
| 5,923,735 A | | 7/1999 | Swartz et al. ............ | 379/93.12 |
| 5,936,860 A | | 8/1999 | Arnold et al. ......... | 364/468.01 |
| 5,984,182 A | | 11/1999 | Murrah et al. .............. | 235/383 |
| 5,987,135 A | | 11/1999 | Johnson et al. .............. | 380/25 |
| 6,016,957 A | | 1/2000 | Ohki et al. | |
| 6,029,068 A | | 2/2000 | Takahashi et al. .......... | 455/426 |
| 6,041,183 A | | 3/2000 | Hayafune et al. ........... | 395/712 |
| 6,049,813 A | | 4/2000 | Danielson et al. .......... | 708/100 |
| 6,097,339 A | | 8/2000 | Filipovic et al. ............ | 343/702 |
| 6,184,833 B1 | | 2/2001 | Tran .......................... | 343/700 |
| 6,195,694 B1 | | 2/2001 | Chen et al. | |
| 6,234,389 B1 | | 5/2001 | Valliani et al. ............. | 235/380 |
| 6,270,271 B1 | | 8/2001 | Fujiwara ..................... | 400/693 |
| 6,285,327 B1 | | 9/2001 | See ............................ | 343/702 |
| 6,311,165 B1 | | 10/2001 | Coutts et al. | |

(Continued)

FOREIGN PATENT DOCUMENTS

WO      WO 99/67851     12/1999

(Continued)

OTHER PUBLICATIONS

*Brochure*: Infinite Peripherals PP-50MS, 2003, no month.

(Continued)

*Primary Examiner*—Jared J. Fureman
(74) *Attorney, Agent, or Firm*—Welsh & Katz, Ltd.

(57) ABSTRACT

A point of sale terminal including point of sale transaction circuitry, and a socket for selectably receiving and supporting a mobile computing/communicating device and for permitting communication between the mobile computing/communicating device and the point of sale transaction circuitry. The point of sale transaction circuitry is operative both independently of and in cooperation with the mobile computing/communicating device.

7 Claims, 3 Drawing Sheets

U.S. PATENT DOCUMENTS

| | | | |
|---|---|---|---|
| 6,334,575 B1 * | 1/2002 | Su-Hui | 235/492 |
| 6,405,055 B1 | 6/2002 | Silverbrook et al. | 455/556 |
| 6,467,688 B1 | 10/2002 | Goldman et al. | 235/472.01 |
| 6,532,435 B1 | 3/2003 | Aoshika et al. | |
| 6,550,672 B1 * | 4/2003 | Tracy et al. | 235/383 |
| 6,550,683 B1 | 4/2003 | Augustine | 235/462.45 |
| 6,615,183 B1 | 9/2003 | Kolls | |
| 6,616,035 B2 * | 9/2003 | Ehrensvard et al. | 235/383 |
| 6,637,661 B2 | 10/2003 | Cohen et al. | 235/472.01 |
| 2002/0042774 A1 * | 4/2002 | Ortiz et al. | 705/39 |
| 2002/0087478 A1 * | 7/2002 | Hudd et al. | 705/64 |
| 2004/0140361 A1 * | 7/2004 | Paul et al. | 235/462.45 |
| 2004/0245341 A1 * | 12/2004 | Shimoda et al. | 235/462.46 |

FOREIGN PATENT DOCUMENTS

| | | |
|---|---|---|
| WO | WO 00/48266 | 8/2000 |

OTHER PUBLICATIONS

"Nurit Control Center (TCC)", http://www.lipman.co.il/content/tcc.html, Nov. 2000.

* cited by examiner

POINT OF SALE TERMINAL INCLUDING A SOCKET FOR RECEIVING A MOBILE DEVICE

FIELD OF THE INVENTION

The present invention relates to point of sale terminals generally.

BACKGROUND OF THE INVENTION

The following publications are believed to represent the current state of

U.S. Pat. Nos. 6,234,389; 6,334,575; 6,405,055 and 6,550,683.

Catalog Sheets of Infinite Peripherals.

Catalog of Lipman Electronic Engineering Ltd.

SUMMARY OF THE INVENTION

The present invention seeks to provide an improved point of sale terminal (POS).

There is thus provided in accordance with a preferred embodiment of the present invention a point of sale terminal including point of sale transaction circuitry, and a socket for selectably receiving and supporting a mobile computing/communicating device and for permitting communication between the mobile computing/communicating device and the point of sale transaction circuitry. The point of sale transaction circuitry is operative both independently of and in cooperation with the mobile computing/communicating device.

In accordance with another preferred embodiment of the present invention the point of sale terminal also includes a display associated with the point of sale transaction circuitry. Preferably, the point of sale terminal also includes transaction security circuitry associated with the point of sale transaction circuitry and with the display. Additionally, the point of sale terminal also includes a hard-wired interface circuitry for permitting communication between the mobile computing/communicating device and the point of sale transaction circuitry. Alternatively, the point of sale terminal also includes wireless interface circuitry for permitting communication between the mobile computing/communicating device and the point of sale transaction circuitry.

In accordance with yet another preferred embodiment of the present invention the mobile computing/communicating device includes a device selected from the group consisting of portable computers, PDAs, beepers, portable telephones, mobile communicators and cellular telephones. Preferably, the point of sale terminal also includes auxiliary memory selectably associatable with the point of sale transaction.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
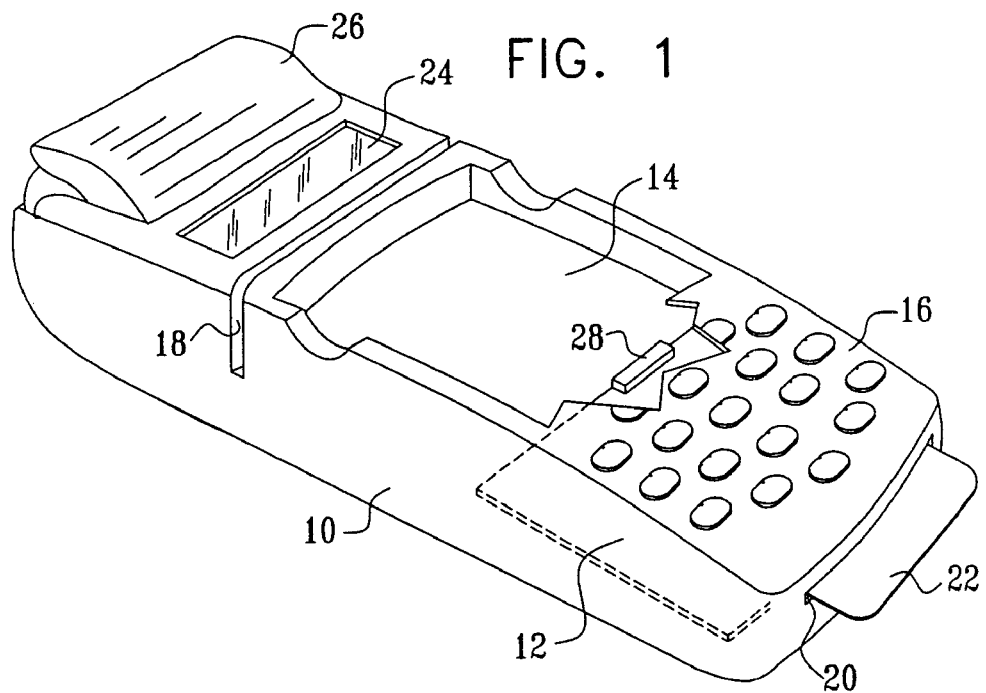
FIG. 1 is a pictorial illustration of a point of sale terminal constructed and operative in accordance with a preferred embodiment of the present invention.

Reference is now made to FIG. 1, which is a pictorial illustration of a point of sale terminal constructed and operative in accordance with a preferred embodiment of the present invention. As seen in FIG. 1, there is provided a point of sale terminal including a housing 10 including point of sale transaction circuitry 12 and a socket 14 for selectably receiving and supporting a mobile computing/communicating device, such as a PDA, cellular telephone or other mobile communicator and for permitting communication between the mobile computing/communicating device and the point of sale transaction circuitry. It is a particular feature of the present invention that the point of sale transaction circuitry 12 is operative both independently of and in cooperation with the mobile computing/communicating device.

More specifically it is seen that the point of sale terminal preferably includes a conventional keypad 16, which interfaces with the point of sale transaction circuitry 12 as well as a conventional magnetic card reader 18 and preferably also a smart card reader 20, which is adapted to receive a smart card 22.

The point of sale terminal also preferably comprises a display 24 and a printer 26.

In accordance with a preferred embodiment of the present invention, the socket 14 is equipped with at least one interface connector 28 enabling communication between a conventional PDA or other mobile computing/communicating device, such as a PCMCIA connector, a RS232 connector and a USB connector. A conventional communication protocol between the point of sale terminal and the PDA or other mobile computing/communicating device, such as a TCP/IP communication protocol, may be employed.

Figure 2:
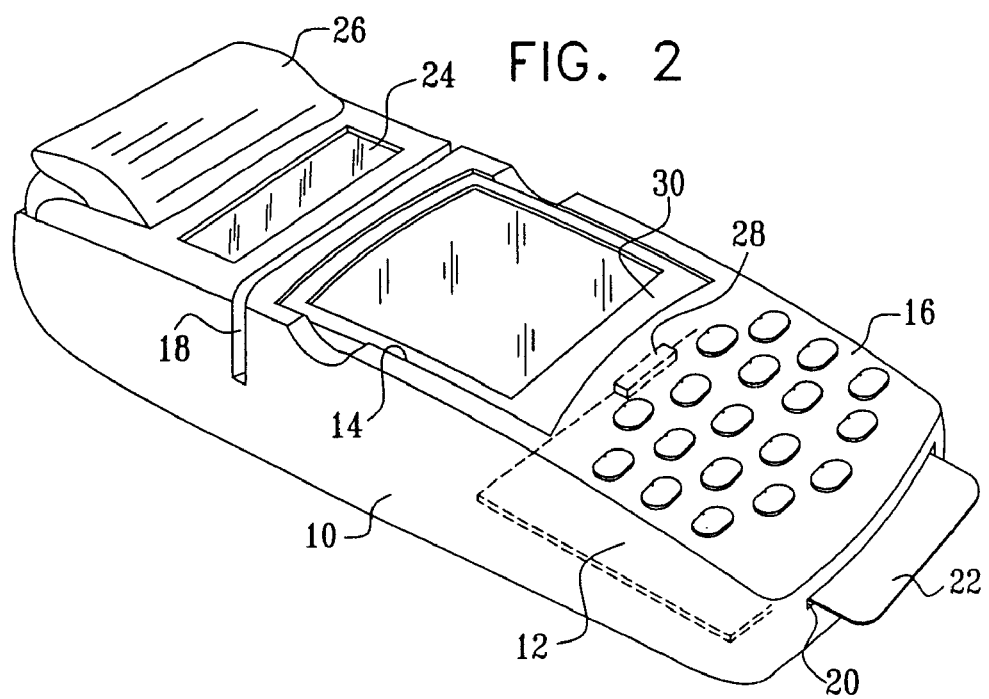
FIG. 2 is a pictorial illustration of the point of sale terminal of FIG. 1 having a PDA mounted therein.

Reference is now made to FIG. 2, which is a pictorial illustration of the point of sale terminal of FIG. 1 having a PDA 30 mounted therein. As seen in FIG. 2, the PDA 30 is seated in socket 14 and is connected via interface connector 28 with the point of sale transaction circuitry 12.

Figure 3B:
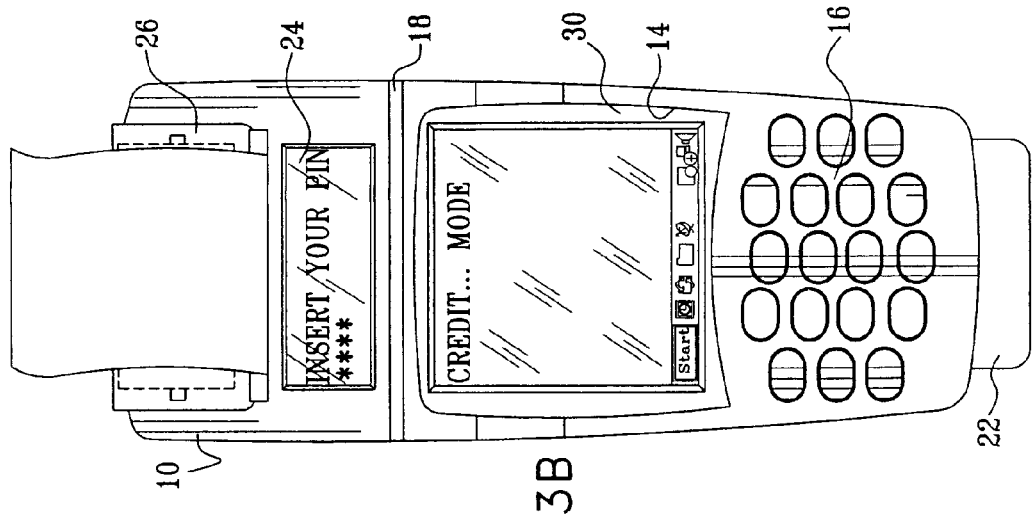
FIGS. 3A and 3B are pictorial illustrations of the point of sale terminal having a PDA mounted therein of FIG. 2 operating respectively in PDA and POS functionalities.
Figure 3A:
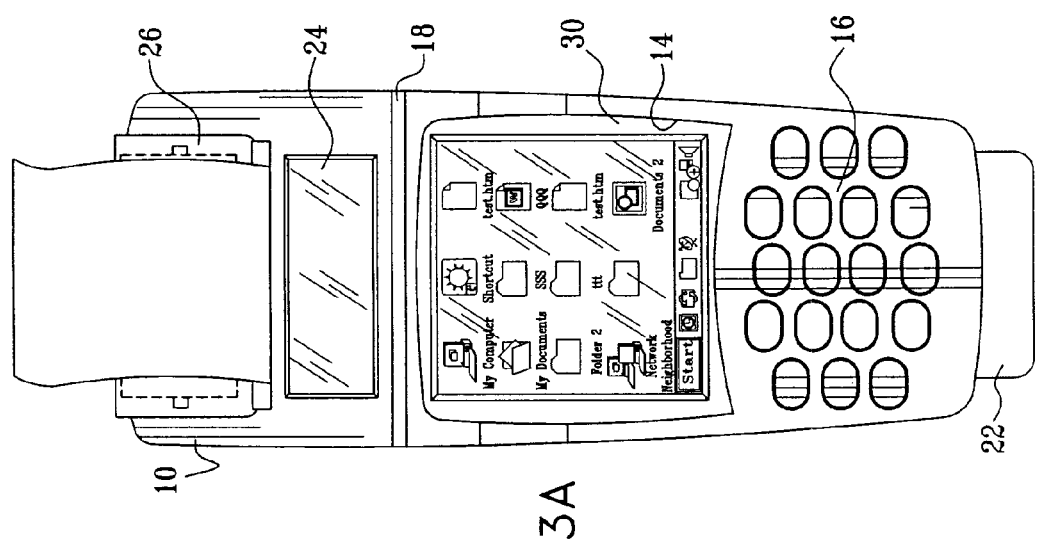

Reference is now made to FIGS. 3A and 3B, which are pictorial illustrations of the point of sale terminal having PDA 30 of FIG. 2 mounted therein operating respectively in PDA and POS functionalities. Turning to FIG. 3A, it is seen that the PDA 30 is enabled to operate as a conventional PDA in all respects, notwithstanding being seated in socket 14 of the point of sale terminal. In this operative environment, the PDA may receive and transmit data in various ways, similarly to a conventional PDA in any other operative environment.

FIG. 3B shows the PDA 30 operative in a POS environment, providing visual prompts to an operator via display 24 and indicating the operative environment via the display 24 of the PDA 30.

It is a particular feature of the present invention that when the PDA 30 is seated in socket 14 and is interconnected with the point of sale transaction circuitry 12 (shown in FIGS. 1 and 2), it enables data communication to and from the point of sale transaction circuitry via the PDA 30, for use with applications that may be written for the PDA. The present invention does not require that the PDA or the POS have wireless communications capability and provides a compact combined device having both enhanced POS and PDA capabilities. Furthermore, when at least one of the PDA 30 and the point of sale transaction circuitry 12 includes a wireless modem, the combined device can operate as a whole as a wireless device vis a vis remote external devices.

Figure 4:
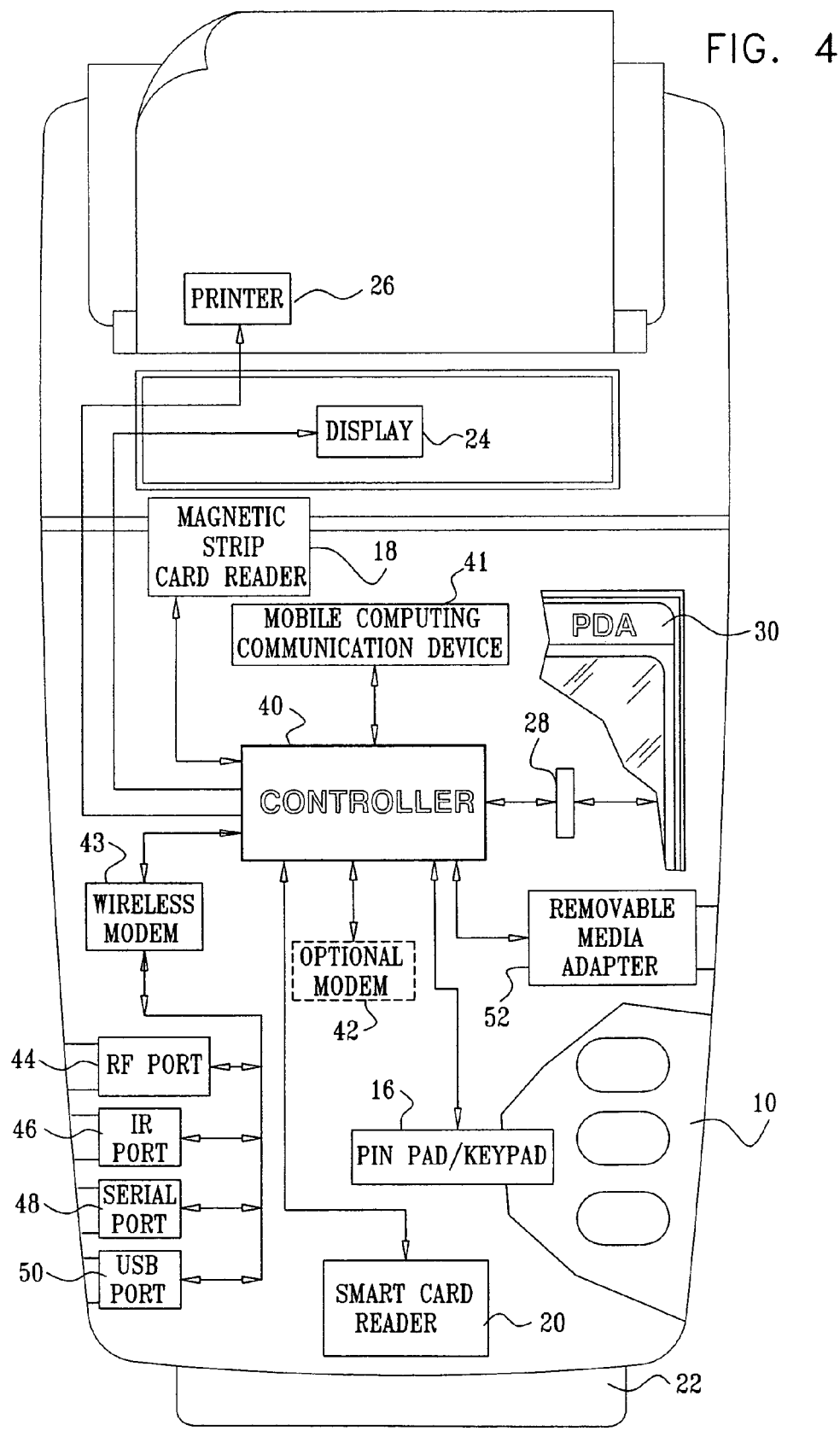
FIG. 4 is a simplified partially pictorial, partially block diagram of the point of sale terminal having a PDA mounted therein of FIG. 2.

Reference is now made to FIG. 4, which is a simplified partially pictorial, partially block diagram of the point of sale terminal having a PDA mounted therein of FIG. 2. As seen in FIG. 4 the point of sale transaction circuitry 12 (shown in FIGS. 1 and 2) preferably includes a controller 40 which interfaces with keypad 16, display 24, printer 26 and with PDA 30 via interface connector 28. Controller 40, which preferably includes conventional point of sale terminal functionality, also preferably interfaces with conventional magnetic card reader 18 and preferably also with smart card reader 20. The controller 40 also interfaces with a mobile computing communication device 41 and may interface with an optional modem 42.

The point of sale transaction circuitry 12 preferably also comprises a wireless modem 43 and various types of communications points such as an RF port 44, and IR port 46, a serial port 48, and a USB port 50. A removable media adapter 52 may also interface with the point of sale transaction circuitry 12. The removable media may be employed for storage, archiving and processing of data relevant to the point of sale functionality and/or to the PDA functionality.

It will be appreciated by persons skilled in the art that the present invention is not limited by what has been particularly shown and described hereinabove but rather includes both combinations and subcombinations of the various features described hereinabove as well as modifications thereto which would occur to a person reading the foregoing which modifications are not in the prior art.

What is claimed is:

1. A point of sale terminal comprising:
   a housing;
   a point of sale key pad located within said housing at a bottom location thereat;
   a point of sale display located within said housing;
   a printer located within said housing at a top location thereat;
   a point of sale transaction circuitry located within said housing;
   at least one card reader located in said housing; and
   a recessed socket defined by said housing at an intermediate location therat,
   said intermediate location being intermediate said key pad at said bottom location and said printer at said top location,
   said socket being configured to accommodate a mobile computing/communicating device
   having a mobile computing/communicating device display therein in an orientation relative to said housing and to said point of sale display wherein said point of sale display and said computing/communicating device display lie generally parallel to each other.

2. A point of sale terminal according to claim 1 wherein said point of sale display is associated with said point of sale transaction circuitry.

3. A point of sale terminal according to claim 2 and also comprising transaction security circuitry associated with said point of sale transaction circuitry and with said point of sale display.

4. A point of sale terminal according to claim 1 and also comprising a hard-wired interface circuitry for permitting communication between said mobile computing/communicating device and said point of sale transaction circuitry.

5. A point of sale terminal according to claim 1 and also comprising wireless interface circuitry for permitting communication between said mobile computing/communicating device and said point of sale transaction circuitry.

6. A point of sale terminal according to claim 1 and wherein said mobile computing/communicating device comprises a device selected from the group consisting of portable computers, PDAs, beepers, portable telephones, mobile communicators and cellular telephones.

7. A point of sale terminal according to claim 1 and also comprising auxiliary memory selectably associatable with said point of sale transaction circuitry.

* * * * *